F. E. HORN.
FISHING REEL.
APPLICATION FILED OCT. 17, 1914.

1,159,031.

Patented Nov. 2, 1915.

Inventor
Floyd E. Horn,

Witnesses
Frederick W. Ely
R. M. Smith

By Victor J. Evans
Attorney

UNITED STATES PATENT OFFICE.

FLOYD E. HORN, OF PHILLIPSBURG, NEW JERSEY.

FISHING-REEL.

1,159,031.

Specification of Letters Patent.

Patented Nov. 2, 1915.

Application filed October 17, 1914. Serial No. 867,190.

*To all whom it may concern:*

Be it known that I, FLOYD E. HORN, a citizen of the United States, residing at Phillipsburg, in the county of Warren and State of New Jersey, have invented new and useful Improvements in Fishing-Reels, of which the following is a specification.

This invention relates to fishing reels, the general object of the present invention being to provide an attachment for a reel of the class described which will prevent the breaking of the fishing line when an unusually heavy fish is caught by the hook and makes an effort to carry the line away, the invention operating to permit the reel to unwind and pay out the line while the reel winding handle is held stationary, the device also acting as a brake or drag to resist the unreeling of the line.

With the above and other objects in view, the invention consists in the novel construction, combination and arrangement of parts, as herein described, illustrated and claimed.

Figure 1:
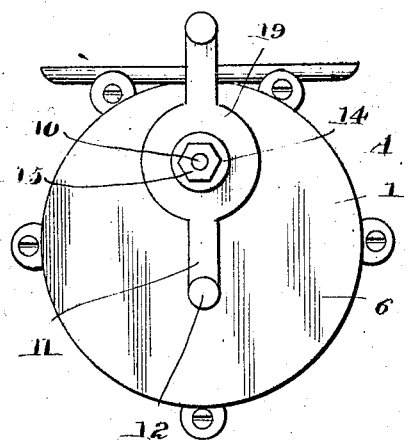
Figure 2:
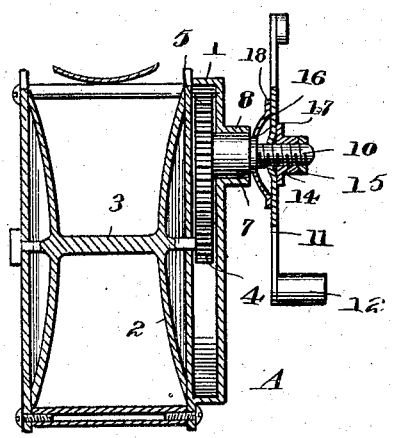
Figure 3:
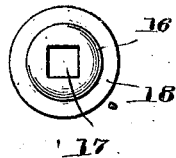
Figure 4:
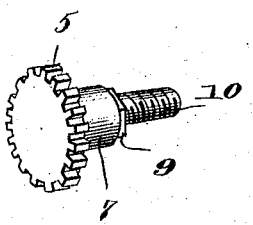

In the accompanying drawings: Figure 1 is a side elevation of a fishing reel having the present invention applied thereto. Fig. 2 is a diametrical section through the same taken centrally of the actuating gears. Fig. 3 is a detail view of the brake or spring. Fig. 4 is a detail view of the crank shaft.

Referring to the drawings A generally designates a reel which in the main involves the ordinary construction, 1 designating the frame of the reel, 2 the reel proper, 3 the reel shaft, 4 the pinion on the end of said shaft, 5 the spur gear which drives the pinion 4 and winds the reel and 6 the gear case in which the gears 4 and 5 are mounted and housed.

In carrying out the present invention, the gear wheel 5 is mounted upon a crank shaft 7 which is journaled in a sleeve extension 8 of the gear case 6, said shaft 7 being formed just beyond the sleeve bearing 8 with a squared shoulder 9 and beyond the shoulder 9 the crank shaft 7 is provided with a reduced and threaded end portion 10 on which is placed the winding crank 11 having the usual handle 12 and provided with a round hole 13 adapting the same to rotate upon the threaded portion 10 of the crank shaft, the crank 11 being retained in its position on the crank shaft by means of a nut 14 in turn secured by a jam or lock nut 15. A disk-shaped spring or friction brake 16 having a squared central opening 17 is placed upon the crank shaft 7 so as to engage the squared shoulder 9 thereof and turn with the crank shaft. The member 16 is dished and only the marginal portion 18 thereof bears frictionally against the inner face of the crank 11 the central portion of which is of disk-shape as shown at 19 the same being of equal size or slightly larger than the diameter of the spring or brake 16. The tension of the spring 16 and its braking effect may be increased or diminished and regulated to a nicety in accordance with the work to be performed by adjusting the nut 14 which therefore becomes a tensioning device. When the nut 14 has been adjusted as desired, the adjustment may be fixed and maintained by means of the jam nut 15.

From the foregoing description taken in connection with the accompanying drawings it will now be seen that the reel may be wound in the ordinary manner by operating the crank 11. Should the fish jerk the line with sufficient force to endanger the line, instead of the line breaking, the reel will unwind under the pulling action on the line while the operating crank 11 is still held by the operator, the friction brake or spring 16 admitting of such backward movement of the reel. It also serves to keep the line under tension and assists in that way in catching the fish. It will also be observed that the invention may be applied to any reel now on the market by merely altering the crank shaft to receive the member 16 and employing a crank of the kind above described and tensioning nut so as to obtain the advantages above referred to.

What I claim is:—

The combination with the crank shaft of a fishing reel, of a crank mounted loosely on said shaft, a combined disk-shaped friction brake nd spring mounted to rotate with said shaft and embodying a dished and resilient central body portion the rim only of which bears frictionally against the adjacent side of the operating crank, and means for adjusting the tension of said spring.

In testimony whereof I affix my signature in presence of two witnesses.

FLOYD E. HORN.

Witnesses:
CHAS. B. BRUNNER,
F. M. HOWARD.